United States Patent
Yan (10) Patent No.: US 8,155,189 B2
(45) Date of Patent: Apr. 10, 2012

(54) SYSTEM AND METHOD OF CODING MODE DECISION FOR VIDEO ENCODING

(75) Inventor: Yong Yan, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1689 days.

(21) Appl. No.: 11/253,517

(22) Filed: Oct. 19, 2005

(65) Prior Publication Data

US 2007/0086523 A1    Apr. 19, 2007

(51) Int. Cl.
H04N 11/04    (2006.01)
(52) U.S. Cl. .............................. 375/240.13; 375/240.24
(58) Field of Classification Search ............ 375/240.13, 375/240.16, 240.24
See application file for complete search history.

(56) References Cited

U.S. PATENT DOCUMENTS

| | | | |
|---|---|---|---|
| 5,493,514 A * | 2/1996 | Keith et al. ................. | 709/247 |
| 6,865,227 B2 | 3/2005 | Chan | |
| 2002/0136303 A1* | 9/2002 | Sun et al. .................. | 375/240.16 |
| 2003/0142751 A1* | 7/2003 | Hannuksela ............. | 375/240.25 |
| 2004/0139462 A1 | 7/2004 | Hannuksela et al. | |
| 2004/0146113 A1 | 7/2004 | Valente | |
| 2005/0025249 A1 | 2/2005 | Zhao et al. | |
| 2006/0013299 A1* | 1/2006 | Sato et al. ................. | 375/240.03 |
| 2006/0222075 A1 | 10/2006 | Zhang et al. | |

FOREIGN PATENT DOCUMENTS

| | | | |
|---|---|---|---|
| JP | 2005244749 A | 9/2005 | |
| WO | WO 2005/004491 A1 | 1/2005 | |

OTHER PUBLICATIONS

Sullivan, Gary J. et al.; "The H.264/AVC Advanced Video Coding Standard: Overview and Introduction to the Fidelity Range Extensions"; SPIE Conference on Applications of Digital Image Processing XXVII; Aug. 2004; pp. 1-21.
International Search Report.
Thomas Wiegand, Gary J. Sullivan, Gisle Bjontegaard and Ajay Luthra, *Overview of the H.264/AVC Video Coding Standard* IEEE Transactions on Circuits and Systems for Video Technology, vol. 13, No. 7 Jul. 2003.
Iain E G Richardson, *H.264/MPEG-4 Part 10:Overview*, www.vcodex.com dated Oct. 7, 2002; pp. 1-3.
Iain E G Richardson, *H.264/MPEG-4 Part 10:Introduction to CABAC*, www.vcodex.com dated Oct. 17, 2002; pp. 1-3.

(Continued)

*Primary Examiner* — Vu Le
*Assistant Examiner* — Michael Vanchy, Jr.
(74) *Attorney, Agent, or Firm* — Gary R. Stanford (57) ABSTRACT

A method of making a coding mode decision for a current macroblock of a current video frame including determining an INTERSAD value, selecting at least one video characteristic associated with the current video frame, comparing the INTERSAD value with a corresponding range of each selected video characteristic, selecting interframe coding if the INTERSAD value is within the corresponding range of each selected video characteristic, performing intraframe prediction to provide an intraframe prediction macroblock and determining an INTRASAD value if the INTERSAD value is an outlier of any selected video characteristic, selecting intraframe coding if the INTERSAD value is greater than the INTRASAD value and otherwise selecting interframe coding. The video characteristics may be based on any combination of an average of interframe differential sums, a sum of absolute differences between each pixel value of the current macroblock and a mean pixel value of the current macroblock, and a quantization parameter.

20 Claims, 6 Drawing Sheets

OTHER PUBLICATIONS

Iain E G Richardson, *H.264/MPEG-4 Part 10:Variable Length Coding*, www.vcodex.com dated Oct. 17, 2002; pp. 1-7.

Iain E G Richardson, *H.264/MPEG-4 Part 10:Transform & Quantization*, www.vcodex.com dated Mar. 19, 2003; pp. 1-9.

Iain E G Richardson, *H.264/MPEG-4 Part 10:Interprediction*, www.vcodex.com dated Mar. 30, 2003; pp. 1-3.

Iain E G Richardson, *H.264/MPEG-4 Part 10:Intra Prediction*, www.vcodex.com dated Mar. 30, 2003; pp. 1-5.

Iain E G Richardson, *H.264/AVC Frame and Picture Management*, www.vcodex.com dated Jan. 29, 2004; pp. 1-7.

Wayne E. Bretl and Mark Fimoff, *MPEG2 Tutorial* (*Introduction to MPEG 2 Video Compression*), www.bretl.com Jan. 15, 2000. http://www.bretl.com/mpeghtml/mpeg2vc1.HTM.

Yu Chen, Keman Yu, Jiang Li and Shipeng Li, *An Error Concealment Algorithm for Entire Frame Loss in Video Transmission*, Picture Coding Symposium 2004, Dec. 15-17, 2004, San Francisco, USA.

J.Park, D-C Park, R.J. Marks, M.A. El-Sharkawi, *Content-Based Adaptive Spatio-Temporal Methods for MPEG Repair*, IEEE Trans, ON Image Processing, vol. 13, No. 8, Aug. 2004.

Richardson, Iain E.G. "H.264/MPEG-4 Part 10 Intra Prediction." White Paper. Apr. 30, 2003. pp. 1-6. Downloaded from www.vcodex.com.

\* cited by examiner

SYSTEM AND METHOD OF CODING MODE DECISION FOR VIDEO ENCODING

BACKGROUND OF THE INVENTION

1. Field of the Invention

The present invention relates in general to video encoding, and more specifically to a system and method of selecting the coding method for the macroblocks of a video frame.

2. Description of the Related Art

The Advanced Video Coding (AVC) standard, Part 10 of MPEG4 (Motion Picture Experts Group), otherwise known as H.264, includes advanced compression techniques that were developed to enable transmission of video signals at a lower bit rate or storage of video signals using less storage space. The newer standard outperforms video compression techniques of prior standards in order to support higher quality streaming video at lower bit-rates and to enable internet-based video and wireless applications and the like. The standard does not define the CODEC (encoder/decoder pair) but instead defines the syntax of the encoded video bitstream along with a method of decoding the bitstream. Each video frame is subdivided and encoded at the macroblock (MBs) level, where each MB is a 16×16 block of pixels. Each MB is encoded in 'intraframe' mode in which a prediction MB is formed based on reconstructed MBs in the current frame, or 'interframe' mode in which a prediction MB is formed based on the MBs of the reference frames. The intraframe coding mode applies spatial information within the current frame in which the prediction MB is formed from samples in the current frame that have previously encoded, decoded and reconstructed. The interframe coding mode utilizes temporal information from previous and/or future reference frames to estimate motion to form the prediction MB.

A so-called "Reference CODEC", such as according to JM85 of the JVT (Joint Video Team) of ISO/ITU, incorporates a method of making coding mode decisions for the encoder. The Reference CODEC is computationally intensive since it performs both interframe and intraframe coding, calculates bit-rate and distortion for each coding result, and selects the coding method having superior bit-rate and distortion. The Reference CODEC encoding process involves computationally intensive block transform and quantization of a residual or difference block for each interframe and intraframe coding method. The Reference CODEC encoding process further requires real rate and distortion calculations for each method in which distortion is determined from the reconstructed MB and the rate is the bit-rate necessary for coding the MB. Although this potentially achieves optimal results, the Reference CODEC encoding process consumes valuable resources and is not considered a practicable solution for many applications. For example, the computationally expensive intraframe prediction process is performed for each MB even if the intraframe coding method is rejected.

The complexity of the encoder is a bottleneck for multimedia applications using video, especially in wireless and mobile devices in which the computing and power resources are limited. It is desired to simplify the mode decision and balance the interframe and intraframe coding decisions to conserve resources while providing acceptable coding efficiency and visual quality. It is desired to provide a suitable mode decision process which balances coding efficiency, video quality and computation performance. It is also desired to take advantage of the skip mode to bypass the encoding process of the MB under certain conditions, such as when the MB is part of a large moving object.

BRIEF DESCRIPTION OF THE DRAWINGS

The benefits, features, and advantages of the present invention will become better understood with regard to the following description, and accompanying drawing in which.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
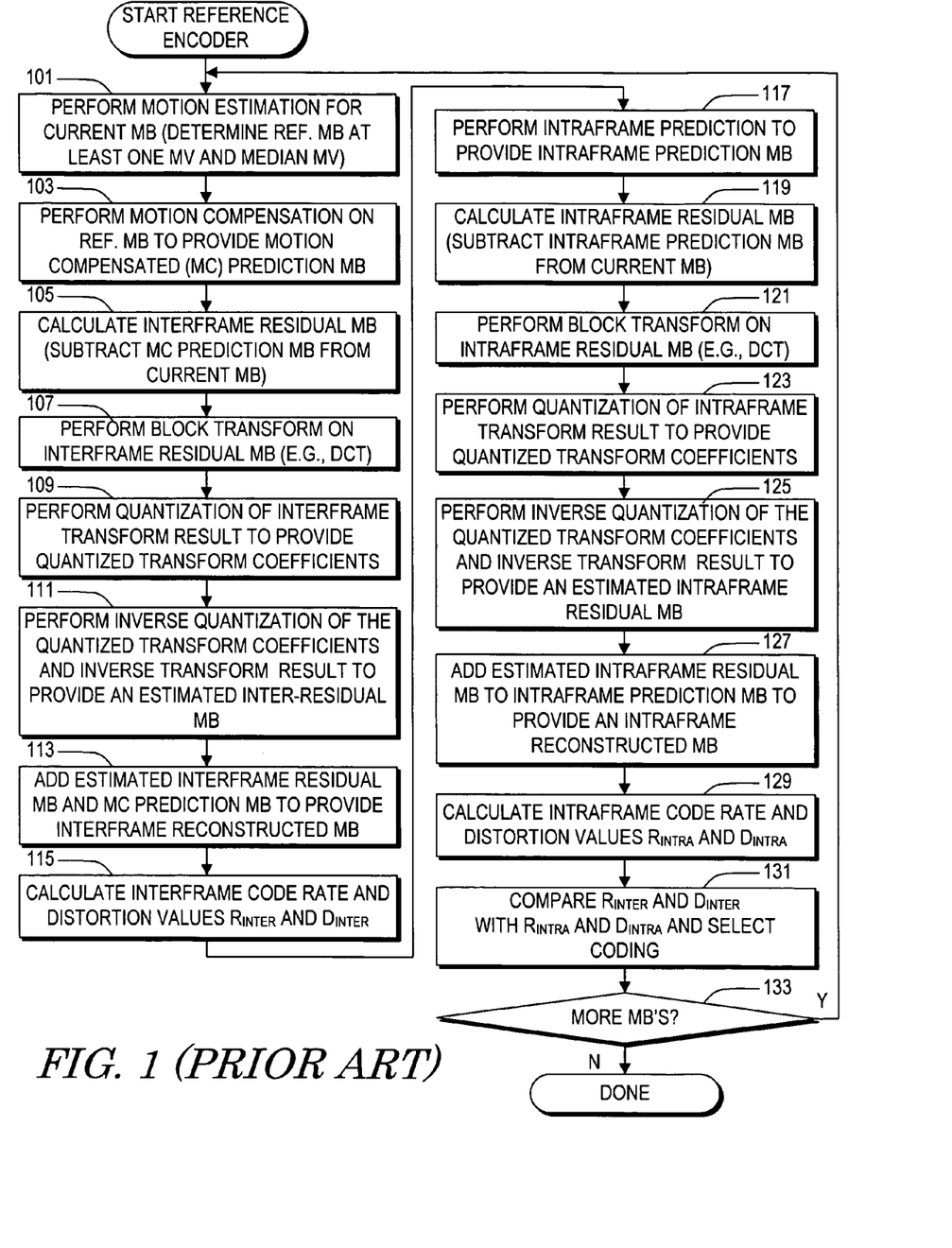
FIG. 1 is a simplified flowchart diagram illustrating an exemplary encoding process performed by the Reference CODEC according to prior art.

FIG. 1 is a simplified flowchart diagram illustrating an exemplary encoding process performed by the Reference CODEC according to prior art. At first block 101, a motion estimation process is performed on a current macroblock (MB) of a current frame being encoded. The motion estimation process is known by those skilled in the art and is not described in significant detail. A reference MB is identified, such as from the last or previous encoded frame, and the conventional motion estimation process determines at least one motion vector (MV) between the reference MB and the current MB. Furthermore, a byproduct of the motion estimation process is a median MV which is the median value of the motion vectors of the neighboring or adjacent MBs of the current frame that have already been encoded. The adjacent macroblocks typically include the upper-right MB, the upper-middle MB, the upper-left MB and the left-hand side MB relative to the current MB as known to those skilled in the art. For purposes of motion estimation in the embodiment illustrated, only the "luma' or brightness information is used. The reference MB may be identified at the integer level (e.g., down to the pixel level) or optionally at the sub-pixel level such as to ½ or ¼ pixel resolution for greater accuracy. For sub-pixel resolution, the pixels of the MB are interpolated from the surrounding pixel information. At next block 103, the motion compensation process is performed on the reference MB and a motion compensated prediction MB is determined. The chroma information of the current MB is included for purposes of motion compensation in the embodiment illustrated. Since interpolation, if necessary, has already been performed during the motion estimation process, the interpolation is applied to the chroma information during motion compensation to provide the motion compensated prediction MB.

At next block 105, the motion compensated MB is subtracted from the current MB to provide a resulting residual MB, which is referred to as an interframe residual MB since determined using information from another frame. At next block 107, a block transform is performed on the interframe residual MB, such as using the discrete cosine transform (DCT) or any other suitable transform function. At next block 109, the quantization process is performed on the transformed result to provide quantized transform coefficients. The quantization process is a digital rounding process which may result in a certain loss of accuracy. The quantized transform coefficients may then be entropy encoded to form a compressed bitstream for storage or transmission.

At next block 111, inverse quantization and inverse transform functions are performed on the quantized transform coefficients to achieve a distorted or "estimated" interframe residual MB, which is then added to the motion compensated prediction MB at next block 113 to provide an interframe reconstructed MB. The interframe reconstructed MB is compared with the current MB to calculate rate (R) and distortion (D) values $R_{INTER}$ and $D_{INTER}$, respectively, for the interframe coding process at next block 115. The $R_{INTER}$ and $D_{INTER}$ values effectively determine the relative success of the transformation process.

The intraframe prediction process is performed at next block 117 to provide the intraframe prediction MB. The intraframe prediction MB is analogous to the motion compensated prediction MB for the interframe coding process except based on based on reconstructed MBs in the current frame. At next block 119, the intraframe prediction MB is subtracted from the current MB to provide an intraframe residual MB and then the block transform and quantization processes are performed a blocks 121 and 123, respectively. The quantized transform coefficients may then be entropy encoded to form a compressed bitstream for transmission or storage. At next block 125, inverse quantization and inverse transform functions are performed on the quantized transform coefficients to achieve an estimated intraframe residual MB, which is then added to the intraframe prediction MB at next block 127 to provide an intraframe reconstructed MB. The intraframe reconstructed MB is compared with the current MB to calculate rate and distortion values $R_{INTRA}$ and $D_{INTRA}$, respectively, for the intraframe coding process at next block 129. At next block 131, the $R_{INTER}$ and $D_{INTER}$ values for interframe coding and the $R_{INTRA}$ and $D_{INTRA}$ for intraframe coding are compared and only one of the coding methods is selected for encoding the current MB. At next block 133, it is queried whether there are more macroblocks to be encoded. If more MBs are to be encoded, operation returns to block 101 in which the next MB becomes the current MB and the process is repeated. If the current frame is completed, then the current frame becomes the previous frame and a next frame, if present, becomes the current frame to be encoded. The reconstructed frame is then filtered (e.g., deblocking filter), and then stored in a reference frame database for interframe coding purposes.

As previously noted, the encoding process of the Reference CODEC is computationally intensive since it performs both interframe and intraframe coding, calculates bit-rate and distortion for each, and selects the results of the coding method that provides the superior bit-rate and distortion results. The reference encoding process requires real rate and distortion calculations in which distortion is determined from the reconstructed MB and the rate is the bit rate necessary for coding the MB. Although this may achieve optimal results overall, an implementation according to the Reference CODEC consumes valuable resources and is not considered a practicable solution for many applications. For example, the computationally expensive intraframe prediction process is performed for each MB even if not selected in which case the results are discarded. The software or code implementation of the Reference CODEC may be optimized by including a loop or the like in which the various functions are performed by the same functional blocks with different data from the respective coding methods, e.g., the interframe residual MB versus the intraframe residual MB.

Figure 2:
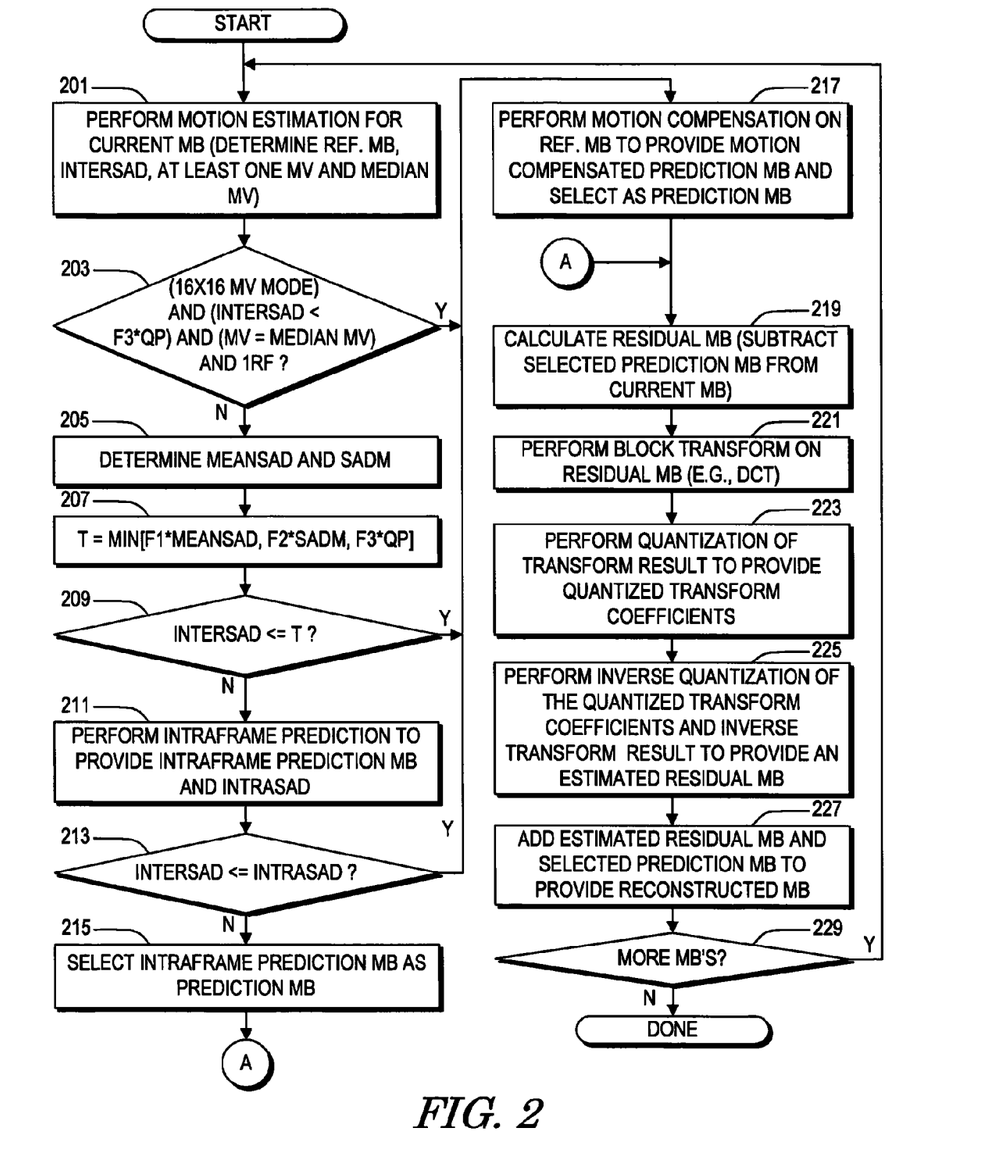
FIG. 2 is a simplified flowchart diagram illustrating an exemplary encoding process performed according to an embodiment of the present invention.

FIG. 2 is a simplified flowchart diagram illustrating an exemplary encoding process performed according to an embodiment of the present invention. The motion estimation process is performed at first block 201 in which the reference MB, at least one motion vector and the median MV are determined. As previously described, the reference MB may be derived from interpolated information if sub-pixel accuracy is desired. Also, an interframe sum of absolute differences (or "INTERSAD") value is calculated based on the current MB and the reference MB. To determine the INTERSAD value, each pixel value of the reference MB is subtracted from the corresponding pixel of the current MB to determine a difference value, the absolute value is determined of the difference value, and the sum of all of the difference values are added together. In this manner, the INTERSAD value is a representation of the differential between the reference MB and the current MB.

Operation proceeds to a next block 203 in which it is queried whether the current MB may possibly be skipped without being encoded, such as when the current MB forms part of a large moving object. The H.264 provides such a skip mode for coding efficiency to handle global motions. If the current MB is determined to be 16×16 motion mode, if INTERSAD is relatively small as compared to a quantization value, if the MV is equal to the median MV, and if only one (1) reference frame is being used for interframe coding (and which is the previous frame for purposes of skipping), then it is possible that coding of the current MB may be skipped in the later coding process. A flag 1RF is true if only the last frame is the reference frame for purposes of encoding. The H.264 standard supports different motion compensation block sizes ranging from 16×16 (in which a single MV is provided for the entire MB) down to 4×4 luminance samples with many options therebetween (including 16×8, 8×16, and various flavors of 8×8 including 8×4, 4×8 and 4×4). The INTERSAD value is compared with a value F3*QP, where QP is the quantization parameter provided by the rate controller estimating the number of bits required in the bitstream after encoding an MB or frame. F3 is a predetermined constant or variable that effectively normalizes the INTERSAD value and QP for purposes of comparison, and an asterisk "*" represents multiplication. In one embodiment, F3 is a constant equal to 32. A rise of QP from the rate controller indicates stressing of the encoder, such as when "struggling" with a complicated scene with limited bandwidth.

If any one of the conditions listed in block 203 is not true, then operation proceeds to block 205 in which two different sum of absolute difference (SAD) values are calculated or otherwise determined, including a MEANSAD value and a SADM value. The MEANSAD value is determined using any one of a variety of different methods. In one embodiment, the MEANSAD is the mean of the INTERSAD values of the entire previous frame. Since an INTERSAD value is determined during motion estimation for each MB, the INTERSAD values of all MBs are averaged together after the coding of the frame is completed and the result is the MEANSAD value for that frame. Alternatively, a running average is kept during encoding (e.g., adjusted with each new MB) and the final averaged INTERSAD value is the MEANSAD for the frame. In one alternative embodiment, the MEANSAD is the average INTERSAD of only the adjacent MBs of the prior encoded frame. Thus, rather than averaging the INTERSADs of the entire prior frame, only the average INTERSADs of the adjacent MBs of the prior frame are used. Since the prior frame has already been completely encoded, the adjacent blocks may include all eight adjacent MBs (i.e., upper-left, upper-middle, upper-right, left-side, right-side, lower-left, lower-middle, lower-right), or any selected subset thereof. In another alternative embodiment, the MEANSAD is the running average of the INTERSADs of the current frame. As noted above, a running average of INTERSADs is kept and updated with each new INTERSAD, where the running average of the current frame is used as the MEANSAD. In yet another alternative embodiment, the MEANSAD is the average of the INTERSADs of the adjacent MB's of the current frame.

The SADM value is the SAD value of all of the 16×16 pixels of the current MB relative to an average or mean pixel value of the current MB. The SADM value is an approximation of the MB variance and represents the relative homogeneity of the current MB. A large value of SADM indicates a non-homogeneous MB which is most likely located on the boundaries of regions. If SADM is relatively large, it is deemed that interframe coding is more likely to result in better visual quality since less spatial correlation exists in the intraframe mode.

Operation then proceeds to block 207 in which a value T is set equal to the minimum of a first function F1 times MEANSAD, a second function F2 times SADM, and the third function F3 times QP. The functions F1-F3 are predetermined constants or variables that effectively normalize and convert the MEANSAD, SADM and QP values for purposes of comparison with the INTERSAD value. In one embodiment, F1 is a constant equal to 1.5, F2 is a constant equal to 1.0, and F3 is a constant equal to 32 as previously noted. The MEANSAD, SADM and QP values, representing temporal, spatial and bit-rate respectively, are generally selected video characteristics for purposes of determining the relative INTERSAD value. As further described below, any one or more of the video characteristics are selected for purposes of comparison. A coding mode decision based on any one of the video characteristics leads to an improvement as compared to no mode decision determination. A comparison of all three of the video characteristics provides the best overall coding mode decision as compared to omitting any of the video characteristics.

At next block 209, it is queried whether INTERSAD is less than or equal to T, which is the minimum of the three different video characteristics listed in block 207 as described above. The functions F1, F2 and F3 establish the threshold values or "ranges" for respective video characteristics. If the distribution of the INTERSAD values is mapped in a Gaussian model, thresholds are set to enable determination and extraction of the larger INTERSAD values in the frame. In general, a relatively large value of INTERSAD from the motion estimation process indicates that the ME process may fail because of scene change or non-translational movement in sequential frames. The INTERSAD is effectively defined as the motion "outlier" in the statistics sense. The INTERSAD value of the current MB should be within a predetermined deviation of the mean value of the macroblock INTERSAD values to indicate a smooth or relatively uniform motion pattern (e.g., the current INTERSAD value is checked against the mean of the previous frame, or that of adjacent MBs in the previous frame or a running average of MBs in the current frame, etc.). The means of the INTERSAD values from frame to frame (or within the frame) represent the smooth and relatively uniform motion pattern without significant changes in the scene. A large differential between INTERSAD relative to SADM indicates a non-homogeneous MB, which is likely located on the boundaries of regions within the frame, and therefore less spatial correlation exist inside the MB and its adjacent MBs. In that case, it is determined that the interframe coding mode, which utilizes temporal correlation, is deemed more likely to achieve a superior visual quality for the current MB. A rise of QP from the rate controller indicates stressing of the encoder, such as when "struggling" with a complicated scene with limited bandwidth. In that case, the intraframe coding mode is deemed to result in a higher bit-rate thereby making the situation worse.

If INTERSAD is greater than T as determined at block 209, then operation proceeds to block 211 in which the intraframe prediction process is performed to determine the intraframe prediction MB based on the adjacent MB's in the current frame that have been previously encoded. Also, an INTRASAD value is determined, which is the SAD between the current MB and the predicted MB. Operation then proceeds to block 213 in which INTERSAD is compared with INTRASAD. The comparison performed at block 213 indicates the relative "cost" of coding between interframe and intraframe coding. If INTERSAD is greater than INTRASAD, then the intraframe prediction mode is selected so that the intraframe prediction MB is selected as the prediction MB. From block 215, operation proceeds to a block 219 described below. If all of the conditions in block 203 are true, or if INTERSAD is less than or equal to T as determined at block 209, or if INTERSAD is less than or equal to INTRASAD as determined at block 213, then operation proceeds instead to block 217 in which motion compensation is performed on the reference MB to provide the motion compensated (MC) prediction MB.

After the intraframe prediction MB is selected as the prediction MB in block 215, or after the MC prediction MB is selected as the prediction MB in block 217, operation proceeds to block 219 in which a residual MB is calculated based on the selected prediction MB. Note that there is no need to distinguish between interframe and intraframe for the residual MB since only one residual MB is selected as the prediction MB, and the selected prediction MB is subtracted from the current MB to determine the residual MB. Operation then proceeds to block 221 in which the block transform, as previously described, is performed on the residual MB. Operation then proceeds to block 223 in which quantization of the transform result from block 221 is performed to provide the quantized transform coefficients. Operation then proceeds to block 225 to perform the inverse quantization and inverse transform to provide an estimated residual MB. Operation then proceeds to block 227 in which the estimated residual MB is added to the selected predication MB to provide the reconstructed MB. As previously described, the reconstructed frame is then filtered through a deblocking filter and then stored in the reference frame database. Also, as described below, the unfiltered reconstructed MBs form part of the reconstructed frame which is used for purposes of the intraframe prediction process.

Figure 3:
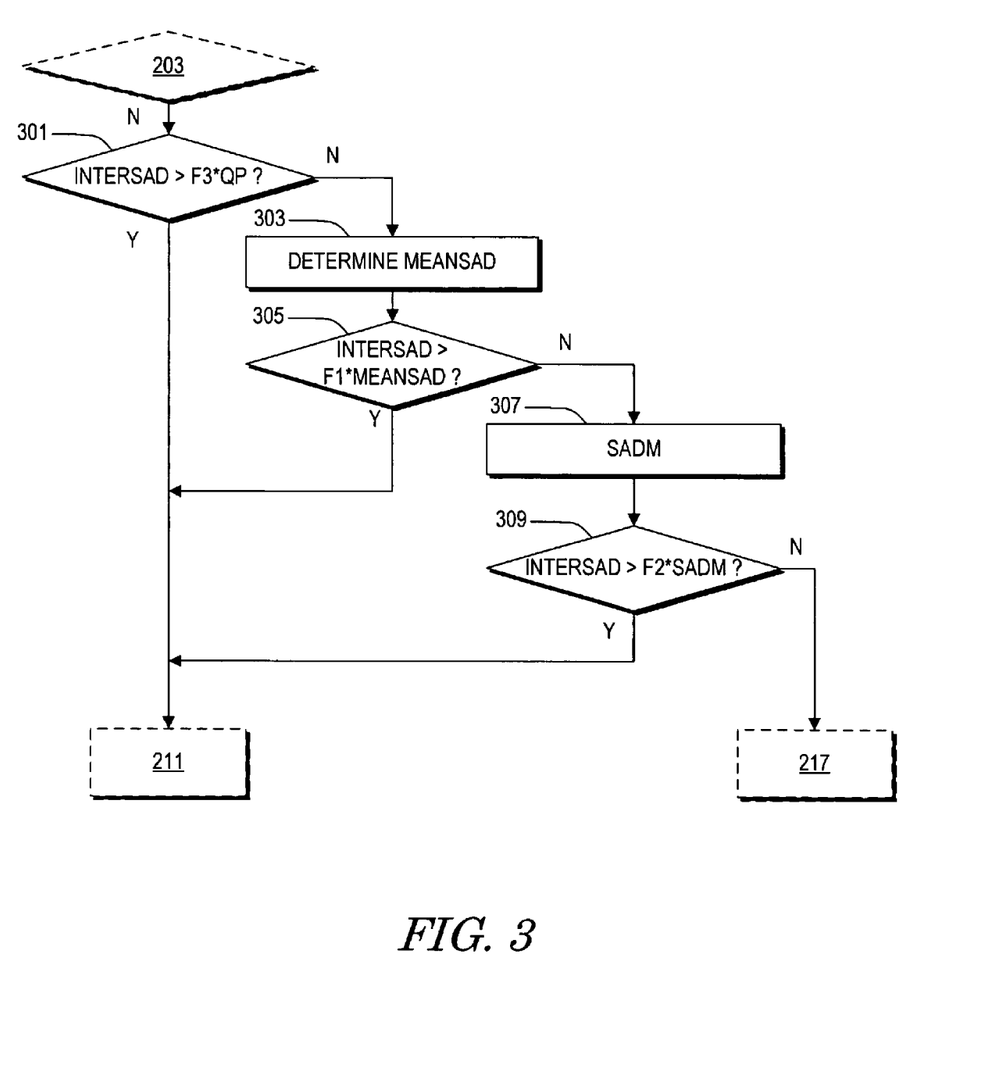
FIGS. 3 and 4 are flowchart diagrams illustrating alternative embodiments of portions of the flowchart of FIG. 2.

FIG. 3 is a flowchart diagram illustrating an alternative embodiment replacing blocks 205, 207 and 209 of FIG. 2 between blocks 203, 211 and 217, shown using dashed lines. It is appreciated that the blocks shown in FIG. 2 describe general functional aspects and that an actual implementation to perform the functions may be achieved in many alternative manners. The flowchart of FIG. 3 performs the same function but allows for improved computational performance for both software coding and/or circuit implementation. As shown in FIG. 3, for example, after block 203, operation may instead proceed to a block 301 in which it is queried whether the INTERSAD value is greater than F3*QP. If so, there is no need to further determine SADM or MEANSAD and operation proceeds directly to block 211. In this case, the QP value is readily available from the rate controller and thus is the simplest condition to check. If the INTERSAD value is not greater than F3*QP, operation proceeds to block 303 in which the MEANSAD value is determined, and then to block 305 in which it is queried whether the INTERSAD value is greater than F1*MEANSAD. In this case, it is deemed that MEANSAD is more easily calculated than SADM, so that SADM is only determined if necessary. If the INTERSAD value is greater than F1*MEANSAD, operation proceeds directly to block 211 as before and the calculation for SADM is skipped. If the INTERSAD value is not greater than F1*MEANSAD, operation proceeds instead to block 307 in which the SADM value is determined, and then to block 309 in which it is queried whether the INTERSAD value is greater than F2*SADM. If the INTERSAD value is greater than F2*SADM, operation proceeds directly to block 211 and if not, operation proceeds to block 217. The particular ordering of the video characteristic comparisons shown in FIG. 3 is exemplary only and may be changed if deemed to achieve better results. For example, if it is determined that SADM is more easily calculated than MEANSAD, then the SADM value and comparison may be performed prior to the MEANSAD comparison.

Figure 4:
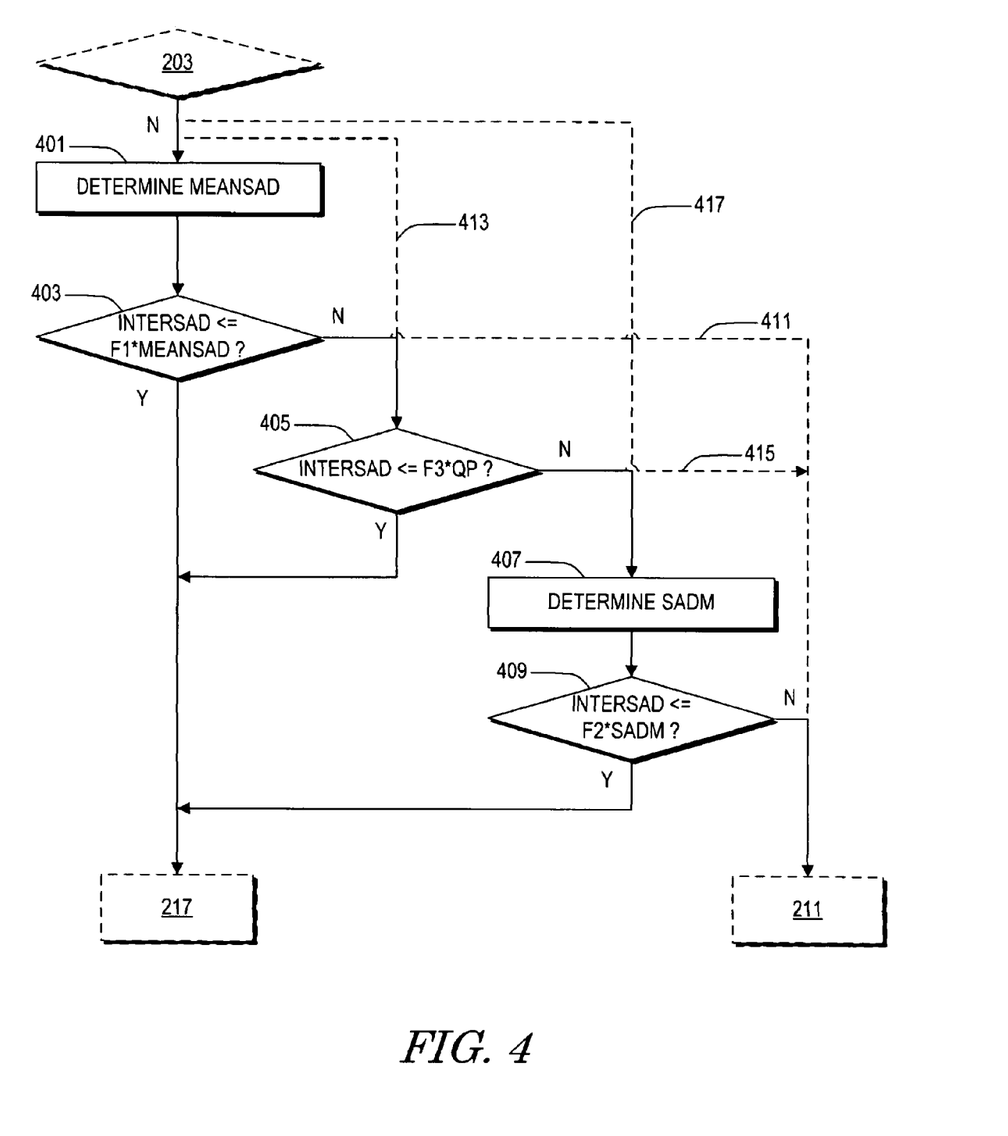

FIG. 4 is a flowchart diagram illustrating another alternative embodiment replacing blocks 205, 207 and 209 of FIG. 2 between blocks 203, 211 and 217, again shown using dashed lines and illustrating selection of video characteristics and prioritization. In this case, operation proceeds from block 203 to block 401 in which the MEANSAD value is determined first and then to block 403 to determine if the INTERSAD value is less than or equal to F1*MEANSAD. In this case, the MEANSAD determination and comparison with the INTERSAD value is deemed to take priority over the QP and SADM comparisons so that it is determined first. If the INTERSAD value is less than or equal to F1*MEANSAD, operation proceeds directly to block 217 and interframe coding is selected and further comparisons for QP, SADM and INTRASAD are bypassed. If the INTERSAD value is greater than F1*MEANSAD, operation proceeds instead to block 405 in which it is queried whether the INTERSAD value is less than or equal to F3*QP, which is deemed in this example as the next highest priority determination. If the INTERSAD value is less than or equal to F3*QP, operation proceeds directly to block 217 and interframe coding is selected and further comparisons for SADM and INTRASAD are bypassed. If the INTERSAD value is greater than F3*QP, operation proceeds instead to block 407 in which SADM is calculated and then to block 409 in which it is queried whether the INTERSAD value is less than or equal to F2*SADM, which is deemed in this example as the lowest priority determination. If the INTERSAD value is less than or equal to F2*SADM, operation proceeds to block 217 and otherwise, operation proceeds directly to block 211. In this example, the functionality of blocks 205, 207 and 209 are changed to prioritize the comparisons.

Many other variations are possible and contemplated. For example, with reference back to block 207 of FIG. 2, the MIN function may be replaced with a MAX function so that as long as the INTERSAD value is less than or equal to any of F1*MEANSAD, F2*SADM or F3*QP, the interframe coding method is selected. FIG. 4 includes several alternative paths shown using dotted lines to illustrate several variations of functionality. For example, if it is desired to select only the MEANSAD value for comparison, an alternative path 411 illustrates that if the INTERSAD value is greater than F1*MEANSAD, then operation proceeds directly to block 211. Or, if it is desired to select only the QP value for comparison, an alternative path 413 bypasses the MEANSAD comparison and directly proceeds from block 203 to block 405. Also, an alternative path 415 is provided to bypass the SADM comparison so that operation proceeds instead directly to block 211. Or, if it is desired to select only the SADM value for comparison, an alternative path 417 bypasses the MEANSAD and QP comparisons and directly proceeds from block 203 to block 407. It is appreciated that the comparisons may be prioritized in any suitable order and that any one or more of the video characteristic comparisons may be selected or skipped depending upon the particular configuration. The selection of all three video characteristics for comparison provides the best results in terms of bit-rate and distortion.

Figure 5:
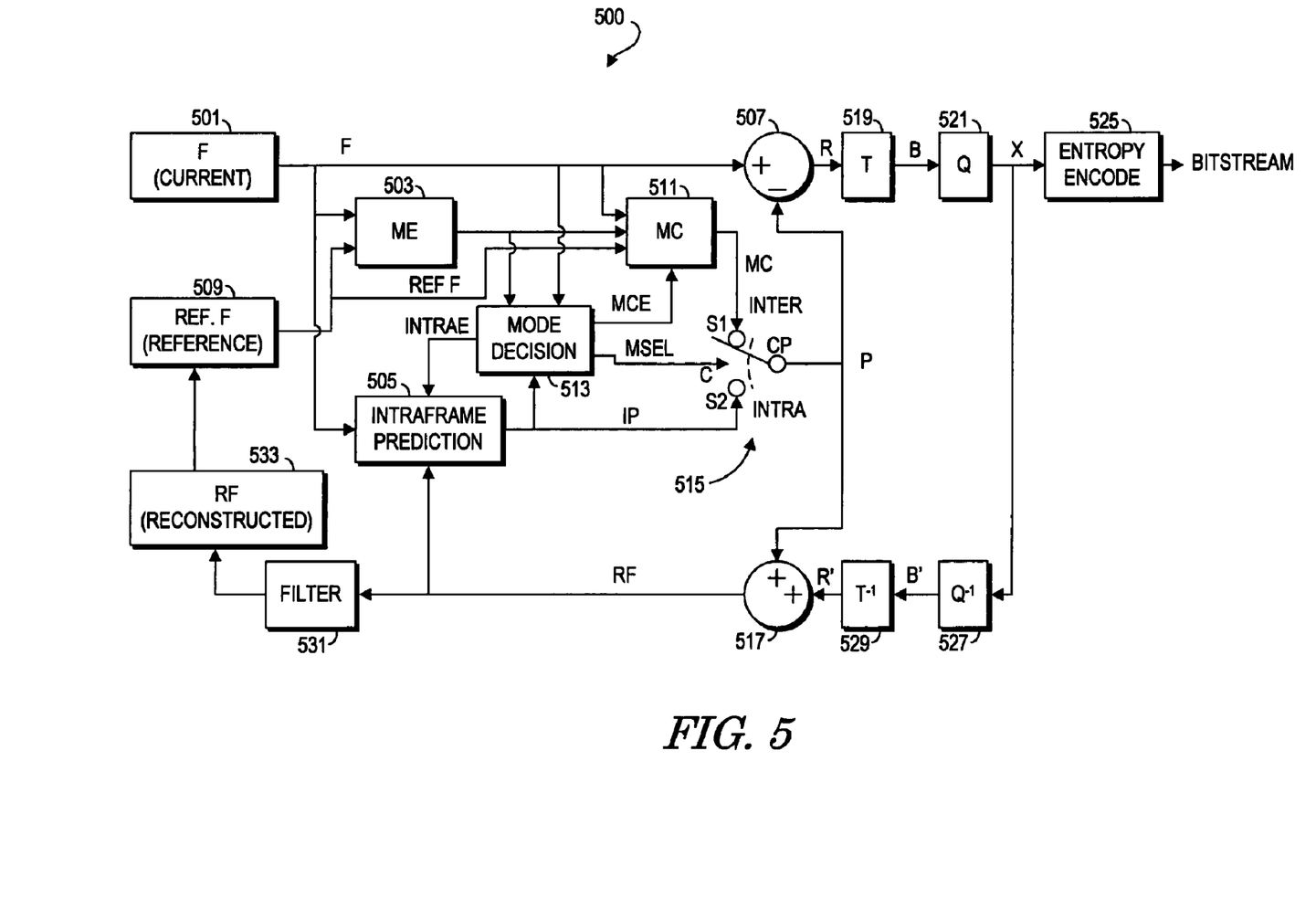
FIG. 5 is a simplified block diagram of an encoder implemented according to an exemplary embodiment of the present invention.

FIG. 5 is a simplified block diagram of an encoder 500 implemented according to an exemplary embodiment of the present invention. A frame storage 501 provides the current frame F for encoding to one input of a motion estimation (ME) circuit 503, to one input of an intraframe prediction circuit 505, to a positive input of a combiner 507 (e.g., adder or subtractor or the like), to one input of a motion compensation (MC) circuit 511, and to an input of a mode decision circuit 513. Another frame storage 509 provides a reference frame (REF F) to another input of the ME circuit 503 and to another input of the MC circuit 511. The reference frame includes one or more previously encoded and decoded frames. The ME circuit 503 provides motion estimation information at its output, which is coupled to another input of the MC circuit 511 and to another input of the mode decision circuit 513. The mode decision circuit 513 has one output providing an intraframe enable signal INTRAE to an enable input of the intraframe prediction circuit 505, and another output providing a motion compensation enable signal MCE to an enable input of the MC circuit 511. The MC circuit 511 provides motion compensated prediction information (e.g., interframe prediction MB) MC to a first input terminal S1 of a selector switch 515, illustrated as a single-pole, double-throw (SPDT) having input terminals S1 and S2, control input terminal C and a common terminal CP providing a selected input as its output. The intraframe prediction circuit 505 provides intraframe prediction information (e.g., intraframe prediction MB) IP to an input of the mode decision circuit 513 and to the input terminal S2 of the switch 515. The mode decision circuit 513 provides a mode decision select signal MSEL to the control terminal C of the switch 515 for selecting between MC (motion compensated interframe MB) or IP (intraframe prediction MB).

The CP terminal of the switch 515 provides a selected prediction MB, illustrated as symbol P, to a negative input of the combiner 507 and to a positive input of another combiner 517, which is an adder in the illustrated embodiment. The combiner 507 subtracts the selected prediction MB P from the current MB of current frame F to provide a residual MB, illustrated as symbol R, to the input of a transform circuit 519. The transform circuit 519 performs a block transform, such as DCT as previously described, and outputs the transform result, illustrated as symbol B. The transform result B is provided to a quantization circuit 521, which outputs quantized transform coefficients, illustrated as symbol X. The X coefficients are provided to the input of an entropy encode circuit 525, which provides a compressed bitstream for transmission or storage. The particular details of entropy encoding are beyond the scope of the present disclosure and will not be further described.

The X coefficients are provided to the input of an inverse quantization circuit 527, which outputs estimated transformed information, illustrated as symbol B' which represents an estimated or reconstructed version of the transform result B. The estimated transformed information B' is provided to the input of an inverse transform circuit 529, which outputs estimated residual information, illustrated as symbol R', which represents a reconstructed version of the residual MB R. The reconstructed residual MB R' is provided to another positive input of the combiner 517. In the embodiment shown, the combiner 517 adds P to R' to generate an unfiltered reconstructed MB, which becomes part of reconstructed frame information RF. The reconstructed frame information RF is provided to another input of the intraframe prediction circuit 505 and to a filter circuit 531. The filter circuit 531 is a deblocking filter (e.g., per H.264 specification) which filters the reconstructed frame RF information and provides filtered reconstructed frames to an RF storage 533. One or two previously encoded and decoded frames from the RF storage 533 are provided to the frame storage 509 to serve as reference frames for purposes of encoding as known to those skilled in the art.

Operation of the encoder 500 is described by the flowchart of FIG. 2 (as modified by the flowcharts of FIG. 3 or 4 as desired). Initially, the MCE and INTRAE enable signals are false or negated low until the mode decision is made. The MSEL signal may default to either position (selecting terminal S1 or S2) or possibly in intermediate position (not shown) until the mode decision is made. The motion estimation circuit 503 performs motion estimation as previously described for block 201 and provides the results to the mode decision circuit 513 and the MC circuit 511. The mode decision circuit 513 determines whether the conditions for block skipping or early exit applies as described for block 203. If so, the mode decision circuit 513 asserts the MCE signal and the MC circuit 511 is enabled to perform the motion compensation functions described above for block 217. Also, the MSEL signal is asserted to select the MC output of the MC circuit 511. In that case, the interframe coding mode is selected and the intraframe coding processes are skipped entirely. If any of the conditions of block 203 are not true, then the mode decision circuit 513 performs the functions of blocks 205, 207 and 209 (or 301, 303, 305, 307 and 309, or 401, 403 405, 407 and 409) to select, determine and compare selected video characteristics (e.g., MEANSAD, SADM, QP) as previously described. If interframe coding is selected, the mode decision circuit 513 then asserts the MCE signal to enable the MC circuit 511 to perform the motion compensation functions described above for block 217 and the MSEL signal is asserted to select the MC output of the MC circuit 511. In that case, the intraframe coding processes are skipped entirely.

Otherwise, if INTERSAD is not within the outliers of the selected video characteristics, then the mode decision circuit 513 asserts the INTRAE signal and the intraframe prediction circuit 505 is enabled to perform intraframe prediction and to determine the INTRASAD value as previously described. The INTRASAD value is provided to the mode decision circuit 513, which compares INTERSAD (from the motion estimation circuit 503) with INTRASAD from the intraframe prediction circuit 505 as described for block 213. If the INTERSAD value is less than or equal to INTRASAD, then the mode decision circuit 513 asserts the MCE signal to enable the MC circuit 511 and asserts the MSEL signal to select the MC output of the MC circuit 511. Even though the initial portion of the intraframe prediction process is initiated in this latter case, the results are not coded and the remaining intraframe coding mode processes are skipped. If, however, the INTERSAD value is greater than INTRASAD, the mode decision circuit 513 asserts the MSEL signal to select the IP output of the intraframe prediction circuit 505. If the intraframe coding method is selected, the motion compensation circuit 511 is not enabled (or its output is rejected) so that further motion compensation processing is bypassed or ignored. The selected prediction MB P is subtracted from the current MB of the current MB of current frame F resulting in the residual MB R as described for block 219. The circuits 519, 521, 527 and 529 perform the functions of the blocks 221, 223 and 225, and the estimated residual MB R' is added to the prediction block P by the combiner 517 and the resulting reconstructed and unfiltered frame information RF is provided to the intraframe prediction circuit 505 and the filter 531 as previously described. It is appreciated that the mode decision circuit 513 of the encoder 500 makes a preliminary mode decision between intraframe coding and interframe coding prior to the actual coding process, so that only one prediction MB is encoded for each current MB.

Figure 6:
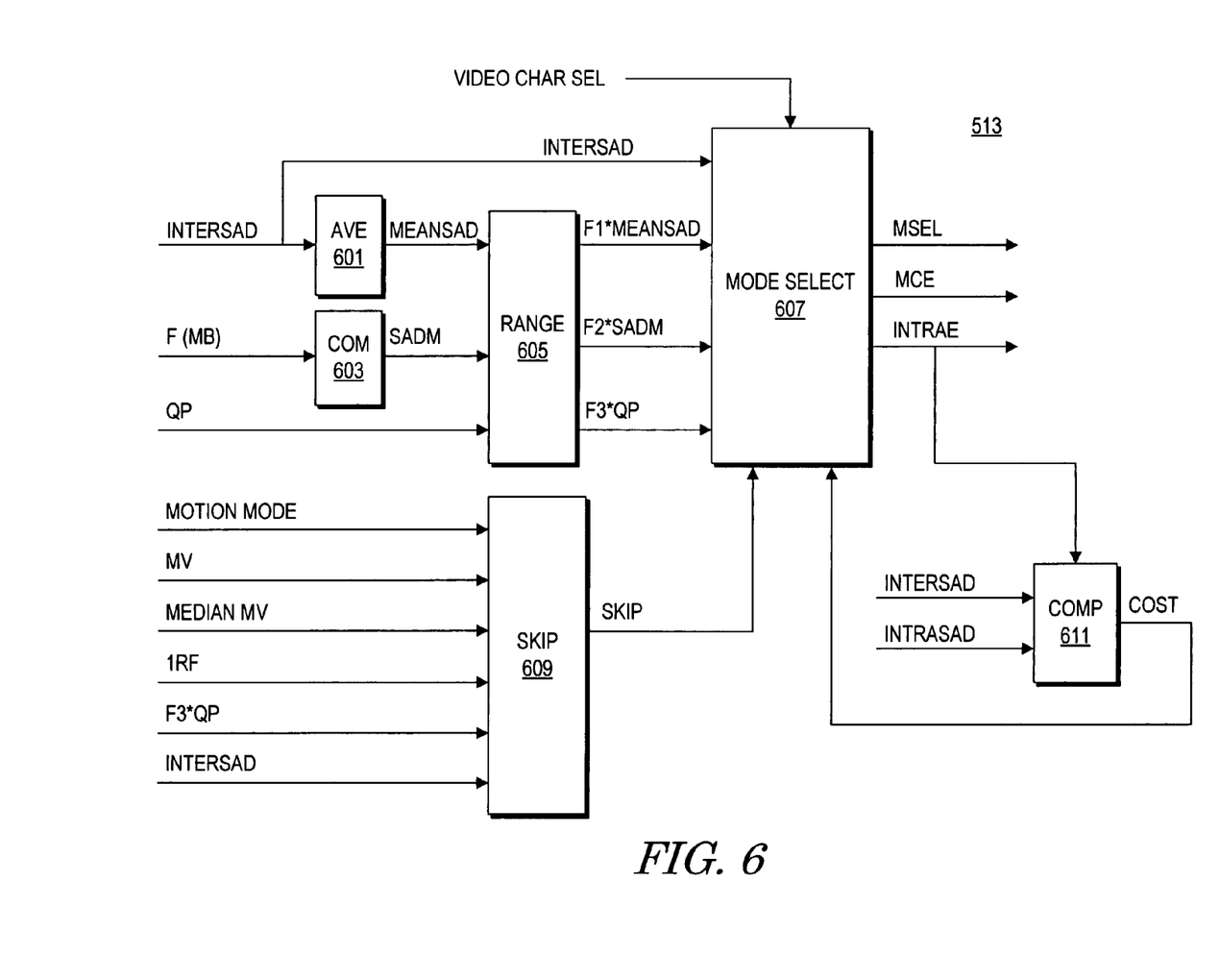
FIG. 6 is a simplified block diagram of an exemplary embodiment of the mode decision circuit of FIG. 5 according to an embodiment of the present invention.

FIG. 6 is a simplified block diagram of an exemplary embodiment of the mode decision circuit 513 according to an embodiment of the present invention. Each INTERSAD value for each MB is provided to the input of an averaging circuit 601, which averages selected INTERSAD values to provide the MEANSAD value. The MEANSAD value may be determined from selected INTERSAD values averaged from the prior frame or the current frame as previously described. The current MB from the current frame F is provided to a computation circuit 603, which calculates the sum of absolute differences of each pixel value of the current MB with its mean value to determine the SADM value as previously described. The MEANSAD, SADM and QP values are provided to a range circuit 605, which multiplies MEANSAD by F1, and multiplies SADM by F2, and QP by F3. The F1*MEANSAD, F2*SADM and F3*QP values are provided to respective inputs of a mode select circuit 607, which also receives the INTERSAD value and a select signal VIDEO CHAR SEL. The VIDEO CHAR SEL signal enables one or more video characterization comparisons as previously described while also optionally indicating priority. The mode select circuit 607 provides the MSEL, MCE and INTRAE signals.

A skip circuit 609 receives a MOTION MODE signal, the motion vector MV, the median MV, the 1RF flag, the F3*QP value and the current INTERSAD value and performs the functions of block 203 as previously described. The skip circuit 609 provides a signal SKIP to the mode select circuit 607. If the SKIP signal is asserted, the mode select signal asserts the MCE signal to enable motion compensation and asserts the MSEL signal to select the interframe coding method. Otherwise, the mode select circuit 607 performs the video characterization comparisons (e.g., blocks 207, or 301, 305, 309, or 403, 405, 409) and determines whether the interframe coding method may be selected. If INTERSAD is an outlier of the selected video characteristics, then the mode select circuit 607 asserts the INTRAE signal to enable the intraframe prediction circuit 505 to perform the intraprediction process. The INTRAE signal is also provided to enable a comparator circuit 611, which compares the INTERSAD value with the INTRASAD value from the intraframe prediction circuit 505. The comparator circuit 611 provides a signal COST back to the mode select circuit 607, which asserts the MSEL signal for selecting the appropriate coding mode as previously described.

Several benefits and advantages of mode decision according to an embodiment of the present invention as compared to the Reference CODEC encoding process are readily apparent. The motion estimation process is substantially identical in both decision processes. If the current MB is a candidate for skipping as determined at block 203 or if the INTERSAD is sufficiently small as determined at block 209, the steps for the intraframe coding process are entirely skipped altogether eliminating a significant amount of processing, interframe coding is selected, and operation proceeds directly to the motion compensation process of block 217. If the INTERSAD is not small as determined at block 209, the intraframe prediction process is performed to determine the INTRASAD value, which is then compared to the INTERSAD value. Thus, the relatively computationally expensive intraframe prediction process is performed only if it becomes more likely that the intraframe coding method will be selected. If the interframe coding method is selected based on this comparison, however, then operation proceeds directly to motion compensation. Otherwise, if the intraframe coding method is selected, then the motion compensation process is bypassed altogether, again saving processing cycles, and the interframe prediction MB is selected for coding. Only the selected prediction MB P is further processed by the residual determination, block transform, quantization, inverse transform and inverse quantization processes. In other words, rather than performing the residual and coding processing on two separate sets of data and making the code decision after both are processed, the coding decision is predetermined prior to the coding process. And further, since the mode decision is made prior to encoding, the resulting estimated residual MB need not be further processed for purposes of the mode decision (e.g., determining the rate and distortion values is no longer necessary). The preliminary mode decision was implemented in an exemplary H.264 encoder and achieved an improvement of average Peak Signal Noise Ratio (PSNR) as compared to an encoder with no mode decision.

An encoder implemented according to an embodiment of the present invention including preliminary mode decision prior to the coding process substantially reduces the encoder's complexity and significantly reduces the coding processing cycles consumed during the encoding process. The encoder is particularly advantageous for use in wireless and mobile devices in which the computing and power resources are limited, although it may be employed in a wide range of video applications to improve performance. The encoder simplifies the mode decision and balances the interframe coding and intraframe coding decisions to conserve resources while providing acceptable coding efficiency and visual quality. The encoder provides a suitable mode decision process while balancing coding efficiency, video quality and computation performance. The encoder takes advantage of the skip mode to enable bypassing of the encoding process of the MB under certain conditions, such as when the MB is part of a large moving object.

A method of making a coding mode decision for a current macroblock of a current video frame according to an embodiment of the present invention includes determining an INTERSAD value (which is an interframe differential sum between the current macroblock and a reference macroblock from a prior video frame), selecting at least one video characteristic associated with the current video frame, comparing the INTERSAD value with a corresponding range of each selected video characteristic, selecting interframe coding if the INTERSAD value is within the corresponding range of each selected video characteristic, performing intraframe prediction to provide an intraframe prediction macroblock and determining an INTRASAD value (which is an intraframe differential sum between the current macroblock and the intraframe prediction macroblock) if the INTERSAD value is an outlier of any selected video characteristic, selecting intraframe coding if the INTERSAD value is greater than the INTRASAD value and otherwise selecting interframe coding.

The method may include summing absolute differences between corresponding pixel values of the current macroblock and the reference macroblock to determine the INTERSAD value. The method may include selecting and determining a MEANSAD value (which is an average of interframe differential sums). The MEANSAD value may be based on macroblocks of the prior video frame or macroblocks of the current video frame. The method may include selecting and determining a SADM value (which is the sum of absolute differences between each pixel value of the current macroblock and a mean pixel value of the current macroblock). The method may include selecting a quantization parameter.

In a more comprehensive embodiment, the method includes selecting and determining a MEANSAD value, selecting and determining a SADM value, selecting a quantization parameter, multiplying the MEANSAD value by a first range value to provide a first parameter, multiplying the SADM value by a second range value to provide a second parameter, multiplying the quantization value by a third range value to provide a third parameter, determining a minimum value of the first, second and third parameters, and comparing the INTERSAD value with the minimum value.

The method may include performing motion estimation and determining the reference macroblock from the prior video frame and at least one corresponding motion vector. The method may include selecting interframe coding if the current macroblock has only one motion vector, if the INTERSAD value is less than a quantization parameter, if a motion vector for the current macroblock is equal to a median motion vector of adjacent macroblocks of the current frame, and if the prior video frame is the only reference frame. The method may include performing motion compensation of the reference macroblock to provide a motion compensated macroblock and selecting the motion compensated macroblock as a prediction macroblock if interframe coding is selected, selecting the intraframe prediction macroblock as the prediction macroblock if intraframe coding is selected, and subtracting the selected prediction macroblock from the current macroblock to provide a residual macroblock for transform.

A video encoder circuit according to an embodiment of the present invention for making a coding mode decision for a current macroblock of a current video frame includes a selector switch, a motion estimation circuit, a motion compensation circuit, an intraframe prediction circuit, and a mode decision circuit. The selector switch has first and second inputs, an output, and a control input that receives a mode signal for selecting between the first and second inputs. The motion estimation circuit performs motion estimation between the current macroblock and a prior video frame to provide an INTERSAD value and to provide a reference macroblock at the output of the motion estimation circuit. The motion compensation circuit performs motion compensation on the reference macroblock in response to a first signal to provide an interframe prediction macroblock at the output of the motion compensation circuit. The intraframe prediction circuit performs intraframe prediction in response to assertion of a second signal to provide an intraframe prediction macroblock and to provide an INTRASAD value at the output of the intraframe prediction circuit. The mode decision circuit selects at least one video characteristic associated with the current video frame, compares the INTERSAD value with a corresponding range of each selected video characteristic, asserts the first signal and the mode signal to select interframe coding if the INTERSAD value is within the corresponding range of the each selected video characteristic, asserts the second signal if the INTERSAD value is an outlier of any selected video characteristic, and asserts the mode signal to select between intraframe coding if the INTERSAD value is greater than the INTRASAD value and interframe coding if the INTERSAD value is less than or equal to the INTRASAD value.

The mode decision circuit may include first, second and third circuits and first and second comparators. The first circuit determines a MEANSAD value, the second circuit determines a SADM value, and the third circuit multiplies the MEANSAD value by a first range value to provide a first video characteristic, multiplies the SADM value by a second range value to provide a second video characteristic, and multiplies a quantization parameter by a third range value to provide a third video characteristic. The first comparator circuit compares the INTERSAD value with the first, second and third video characteristics and provides the first, second and mode signals. The second comparator circuit compares the INTERSAD value with the INTRASAD value.

A mode decision unit for a video encoder for making a coding mode decision for a current macroblock of a current video frame includes means for selecting at least one video characteristic associated with the current video frame, means for comparing an INTERSAD value from motion estimation with a corresponding range of each selected video characteristic, means for initiating intraframe prediction if the INTERSAD value is an outlier of any one of the at least one video characteristic, means for comparing the INTERSAD value with the INTRASAD value, and means for selecting interframe coding if the INTERSAD value is within the corresponding range of the each selected video characteristic or if the INTERSAD value is less than or equal to the INTRASAD value, and for selecting intraframe coding if the INTERSAD value is greater than the INTRASAD value. The mode decision unit may further include means for determining a single motion mode, comparing a motion vector with a median motion mode vector, and for determining a single reference frame count and for providing a skip signal indicative of a likelihood that coding may be skipped for the current macroblock.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A method of making a coding mode decision for a current macroblock of a current video frame, comprising:
   determining an INTERSAD value comprising an interframe differential sum between the current macroblock and a reference macroblock from a previously encoded video frame;
   selecting at least one video characteristic including at least one video characteristic based on previously encoded video information;
   comparing the INTERSAD value with a corresponding range of each selected video characteristic;
   if the INTERSAD value is within the corresponding range of each selected video characteristic, selecting interframe coding;
   if the INTERSAD value is an outlier of any selected video characteristic, performing intraframe prediction to provide an intraframe prediction macroblock based on reconstructed video information of the current video frame and determining an INTRASAD value comprising an intraframe differential sum between the current macroblock and the intraframe prediction macroblock; and
   selecting intraframe coding if the INTERSAD value is greater than the INTRASAD value and otherwise selecting interframe coding.

2. The method of claim 1, wherein said determining an INTERSAD value comprises summing absolute differences between corresponding pixel values of the current macroblock and the reference macroblock.

3. The method of claim 1, wherein said selecting at least one video characteristic comprises selecting and determining a MEANSAD value comprising an average of interframe differential sums.

4. The method of claim 3, wherein said determining a MEANSAD value comprises determining the mean of interframe sums of absolute differences of a plurality of macroblocks of the prior video frame.

5. The method of claim 4, wherein said determining the mean of interfame sums of absolute differences of a plurality of macroblocks of the prior video frame comprises determining the mean of interframe sums of absolute differences of all of the macroblocks of the prior video frame.

6. The method of claim 4, wherein said determining the mean of interfame sums of absolute differences of a plurality of macroblocks of the prior video frame comprises determining the mean of interframe sums of absolute differences of adjacent macroblocks of the prior video frame.

7. The method of claim 3, wherein said determining a MEANSAD value comprises determining the mean of interframe sums of absolute differences of a plurality of macroblocks of the current video frame.

8. The method of claim 1, wherein said selecting at least one video characteristic comprises selecting and determining a SADM value comprising the sum of absolute differences between each pixel value of the current macroblock and a mean pixel value of the current macroblock.

9. The method of claim 1, wherein said selecting at least one video characteristic comprises selecting a quantization parameter.

10. The method of claim 1, further comprising:
    said selecting at least one video characteristic comprising selecting and determining a MEANSAD value comprising an average of interframe differential sums, selecting and determining a SADM value comprising the sum of absolute differences between each pixel value of the current macroblock and a mean pixel value of the current macroblock, and selecting a quantization parameter;
    multiplying the MEANSAD value by a first range value to provide a first parameter;
    multiplying the SADM value by a second range value to provide a second parameter;
    multiplying the quantization value by a third range value to provide a third parameter;
    determining a minimum value comprising a minimum one of the first, second and third parameters; and said comparing the INTERSAD value comprising comparing the INTERSAD value with the minimum value.

11. The method of claim 1, prior to said selecting at least one video characteristic, further comprising performing motion estimation and determining the reference macroblock from the prior video frame and at least one corresponding motion vector.

12. The method of claim 11, prior to said selecting at least one video characteristic, further comprising selecting interframe coding if the current macroblock has only one motion vector, if the INTERSAD value is less than a quantization parameter, if a motion vector for the current macroblock is equal to a median motion vector of adjacent macroblocks of the current frame, and if the prior video frame is the only reference frame.

13. The method of claim 1, further comprising:
if interframe coding is selected, performing motion compensation of the reference macroblock to provide a motion compensated macroblock and selecting the motion compensated macroblock as a prediction macroblock; and
if intraframe coding is selected, selecting the intraframe prediction macroblock as the prediction macroblock; and
subtracting the selected prediction macroblock from the current macroblock to provide a residual macroblock for transform.

14. A video encoder circuit that makes a coding mode decision for a current macroblock of a current video frame, comprising:
a selector switch having first and second inputs, an output, and a control input that receives a mode signal for selecting between said first and second inputs;
a motion estimation circuit, having inputs for receiving the current frame and at least one prior frame and an output, wherein said motion estimation circuit performs motion estimation between the current macroblock and previously encoded video information to provide an INTERSAD value and to provide a reference macroblock at said output of said motion estimation circuit, wherein said INTERSAD value comprises an interframe differential sum between the current macroblock and the reference macroblock from the prior video frame;
a motion compensation circuit, having an input coupled to said output of said motion estimation circuit and an output coupled to said first input of said switch, wherein said motion compensation circuit performs motion compensation on the reference macroblock in response to a first signal to provide an interframe prediction macroblock at said output of said motion compensation circuit;
an intraframe prediction circuit, having an input for receiving the current frame and an output coupled to said second input of said switch, wherein said intraframe prediction circuit performs intraframe prediction in response to assertion of a second signal to provide an intraframe prediction macroblock based on reconstructed video information of the current frame and to provide an INTRASAD value at said output of said intraframe prediction circuit, wherein said INTRASAD value comprises an intraframe differential sum between the current macroblock and said intraframe prediction macroblock; and
a mode decision circuit, having a first output providing said first signal, a second output providing said second signal, and a third output providing said mode select signal, wherein said mode decision circuit selects at least one video characteristic including at least one video characteristic based on previously encoded video information, compares the INTERSAD value with a corresponding range of each selected video characteristic, asserts said first signal and said mode signal to select interframe coding if said INTERSAD value is within the corresponding range of said each selected video characteristic, asserts said second signal if said INTERSAD value is an outlier of any selected video characteristic, and asserts said mode signal to select between intraframe coding if said INTERSAD value is greater than said INTRASAD value and interframe coding if said INTERSAD value is less than or equal to said INTRASAD value.

15. The video encoder circuit of claim 14, further comprising:
a subtractor, having a first input for receiving the current video frame, a second input coupled to said output of said switch, and an output, wherein said subtractor subtracts a selected prediction macroblock from the current macroblock to provide a residual macroblock; and
a conversion circuit, having a first input coupled to said output of said subtractor, a first output providing encoded information, and a second output for providing a reconstructed macroblock.

16. The video encoder circuit of claim 15, wherein said conversion circuit comprises:
a transform circuit, having an input coupled to said output of said subtractor, and having an output;
a quantization circuit, having an input coupled to said output of said transform macroblock, and having an output;
an inverse quantization circuit, having an input coupled to said output of said quantization circuit, and having an output; and
an adder having a first input coupled to said output of said inverse quantization circuit, a second input coupled to said output of said switch, and an output providing said reconstructed macroblock.

17. The video encoder circuit of claim 14, wherein said mode decision circuit comprises:
a first circuit which determines a MEANSAD value comprising an average of interframe differential sums;
a second circuit which determines a SADM value comprising the sum of absolute differences between each pixel value of the current macroblock and a mean pixel value of the current macroblock;
a third circuit which multiplies said MEANSAD value by a first range value to provide a first video characteristic, that multiplies said SADM value by a second range value to provide a second video characteristic, and that multiplies a quantization parameter by a third range value to provide a third video characteristic;
a first comparator circuit which compares said INTERSAD value with said first, second and third video characteristics and that provides said first, second and mode signals; and
a second comparator circuit which compares said INTERSAD value with said INTRASAD value.

18. The video encoder circuit of claim 14, further comprising a comparator circuit which compares a motion mode signal, a motion vector, a median motion mode vector and a reference frame count and which provides a skip signal indicative of a likelihood that coding may be skipped for the current macroblock.

19. A mode decision unit for a video encoder for making a coding mode decision for a current macroblock of a current video frame, comprising:

means for selecting at least one video characteristic including at least one video characteristic based on previously encoded video information;

means for comparing an INTERSAD value from motion estimation with a corresponding range of each selected video characteristic;

means for initiating intraframe prediction if said INTERSAD value is an outlier of any one of said at least one video characteristic, wherein said means for initiating intraframe prediction provides an intraframe prediction macroblock based on reconstructed video information of the current video frame and determines an INTRASAD value comprising an intraframe differential sum between the current macroblock and the intraframe prediction macroblock;

means for comparing said INTERSAD value with said INTRASAD value; and means for selecting interframe coding if the INTERSAD value is within the corresponding range of said each selected video characteristic or if the INTERSAD value is less than or equal to said INTRASAD value, and for selecting intraframe coding if the INTERSAD value is greater than the INTRASAD value.

20. The mode decision unit of claim 19, further comprising means for determining a single motion mode, comparing a motion vector with a median motion mode vector, and for determining a single reference frame count and for providing a skip signal indicative of a likelihood that coding may be skipped for the current macroblock.

* * * * *